(12) United States Patent
Rhodes et al.

(10) Patent No.: US 6,252,859 B1
(45) Date of Patent: Jun. 26, 2001

(54) RADIO COMMUNICATIONS SYSTEM

(75) Inventors: David Brian Rhodes, Reading; Adam Christopher Ogilvie-Smith, Longworth, both of (GB)

(73) Assignee: Racal Communications Systems Limited, Bracknell (GB)

( * ) Notice: Subject to any disclaimer, the term of this patent is extended or adjusted under 35 U.S.C. 154(b) by 0 days.

(21) Appl. No.: 09/075,630

(22) Filed: May 11, 1998

(30) Foreign Application Priority Data

Jun. 16, 1997 (GB) .................................................. 9712499
Jun. 23, 1997 (GB) .................................................. 9713239

(51) Int. Cl.[7] .................................................. H04Q 7/00
(52) U.S. Cl. .......................... 370/329; 370/348; 455/450
(58) Field of Search .................................... 370/329, 310, 370/346, 340, 341, 464, 468; 455/455, 422, 450, 439, 453, 434, 440

(56) References Cited

U.S. PATENT DOCUMENTS

| 4,347,625 | 8/1982 | Williams | 455/17 |
|---|---|---|---|
| 4,360,927 | 11/1982 | Bowen et al. | 455/17 |
| 4,534,061 | 8/1985 | Ulug | 455/17 |
| 4,939,746 | 7/1990 | Childress | 455/33 |
| 5,203,015 | * 4/1993 | George | 455/514 |
| 5,214,789 | * 5/1993 | George | 455/440 |
| 5,377,193 | 12/1994 | Grube et al. | 370/95.1 |
| 5,418,839 | 5/1995 | Knuth et al. | 379/61 |
| 5,497,508 | 3/1996 | George | 455/161.2 |
| 5,613,196 | * 3/1997 | Barnes | 455/512 |
| 6,061,569 | * 5/2000 | Touzeau | 455/455 |

FOREIGN PATENT DOCUMENTS

| 0 167 331 | 1/1986 | (EP) | H04Q/7/02 |
|---|---|---|---|
| 1326696 | 8/1973 | (GB) | H04Q/7/04 |
| 2166622 | 5/1986 | (GB) | H04Q/7/04 |
| WO 91/12670 | 8/1981 | (WO) | H04B/1/00 |
| WO 83/02380 | 7/1983 | (WO) | H04Q/7/00 |

* cited by examiner

Primary Examiner—Douglas Olms
Assistant Examiner—Ricardo M. Pizarro
(74) Attorney, Agent, or Firm—Leydig, Voit & Mayer, Ltd.

(57) ABSTRACT

A radio communications system includes a plurality of talkgroups. Each talkgroup comprises a number of individual radio units having the capability to communicate with each other on one of a number of discrete communications channels temporarily assigned to that talkgroup by a control unit (CU). The control means identifies a communication channel (the selected channel) which is currently idle and transmits a "Free Channel" signal in that channel. A radio unit initiating communication with the other radio units in the same talkgroup starts to transmit on the selected channel, and the control unit (CU) assigns the selected channel to the respective talkgroup in response to the transmission to enable all the radio units in the talkgroup to communicate with each other on the selected channel.

18 Claims, 1 Drawing Sheet

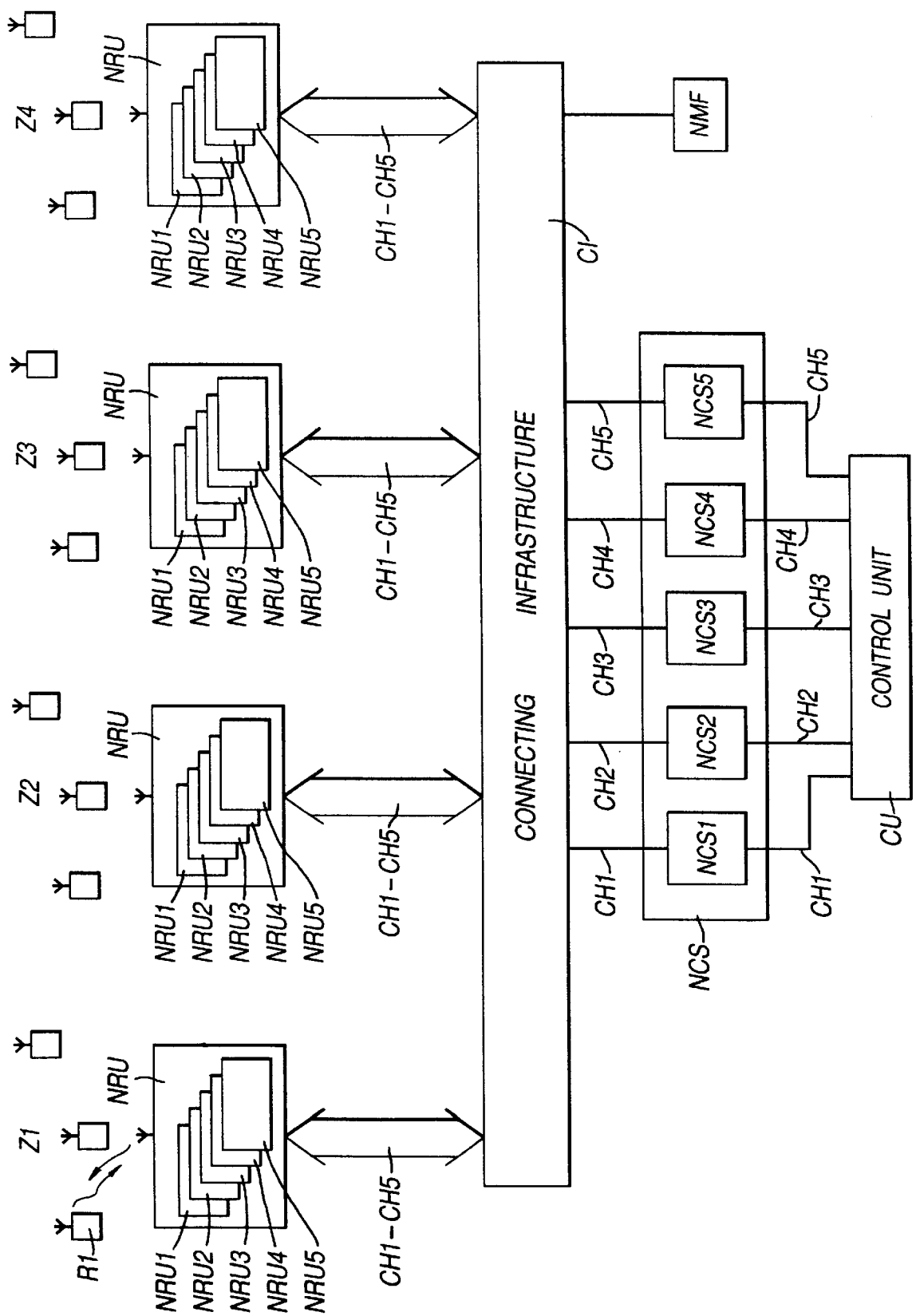

RADIO COMMUNICATIONS SYSTEM

FIELD OF THE INVENTION

This invention relates to radio communications systems, particularly radio communications systems including a plurality of talkgroups.

BACKGROUND OF THE INVENTION

In a typical application, the radio communications system might include as many as 100 different talkgroups, each containing 50 or so individual radio units e.g. mobile and/or hand-portable radios. The talkgroups may be of the 'all informed' type in which data transmitted by each radio unit in a talkgroup will be received by all the other radio units in the same talkgroup.

The management of such a large number of talkgroups presents a significant technical problem. In one approach, a separate communications channel is assigned to each talkgroup. However, in practice, it is unlikely that the required number of channels would be available. Moreover, this approach would require excessive duplication of the system hardware.

In a preferred approach, the talkgroups share a relatively small number of channels. However, in existing systems, a finite set-up time is required in order to assign a communication channel to a talkgroup. More specifically, a radio unit must transmit, on a dedicated control channel, a request that one of the communication channels be assigned to its talkgroup. A finite set-up time is undesirable especially in the case of high priority communications for which delays must be kept to the minimum. Furthermore, the use of a dedicated control channel reduces the number of communication channels available to the talkgroups.

It is an object of this invention to provide a radio communications system which at least alleviates these shortcomings.

SUMMARY OF THE INVENTION

According to the invention there is provided a radio communications system including control means and a plurality of talkgroups, each talkgroup comprising a number of individual radio units having the capability to communicate with each other on one of a number of discrete communication channels temporarily assigned to that talkgroup by the control means, wherein said control means is arranged to identify a said communication channel (the selected channel) which is currently idle and to transmit a 'Free Channel' signal on that channel, said radio units which are not in communication are tuned to said selected channel in response to the 'Free Channel' signal, a said radio unit initiating communication with the other radio units in the same talkgroup will start to transmit on said selected channel to which it is already tuned, and said control means assigns the selected channel to the respective talkgroup in response to said transmission to enable all the radio units in the talkgroup to communicate with each other on the selected channel.

According to another aspect of the invention there is provided a radio communications system including a plurality of different groups of talkgroups, each talkgroup comprising a number of individual radio units having the capability to communicate with each other, a corresponding plurality of groups of communications channels, each said group of communications channels (a home group) being allocated to a different said group of talkgroups, another group of communications channels (the reserve group) which is not allocated to any particular group of talkgroups, and control means, wherein the control means is arranged to identify in each said home group of communications channels a communications channel (the selected channel) which is currently idle and to transmit a 'free channel' signal on that channel, the control means transmits a different 'free channel' signal for each said group of talkgroups and the radio units in each group of talkgroups are responsive to the 'free channel' signal for that group of talkgroups and are unresponsive to the 'free channel' signal for any other group of talkgroups, whereby a radio unit initiating communication with other radio units in the same talkgroup will start to transmit on a said selected channel carrying the 'free channel' signal for that talkgroup's group of talkgroups and the control means assigns the selected channel to that talkgroup in response to this transmission to enable all radio units in the talkgroup to communicate with each other on the selected channel, and the control means has the capability to transmit a said 'free channel' signal on an idle channel of the reserve group of communications channels and to assign that idle channel to a talkgroup if all the communications channels in the corresponding home group of communications channels have already been assigned. According to yet another aspect of the invention there is provided a method for operating a radio communications system including a plurality of talkgroups, each talkgroup comprising a number of individual radio units having the capability to communicate with each other on one of a number of discrete communication channels, the method including identifying a said communication channel (the selected channel) which is currently idle and transmitting a 'free channel' signal on that channel, said radio units which are not in communication being tuned to said selected channel in response to the 'free channel' signal so that a radio unit initiating communication with other radio units in the same talkgroup will start transmitting on the selected channel to which it is already tuned, and assigning the selected channel to the respective talkgroup in response to said transmission to enable all the radio units in the talkgroup to communicate with each other on the selected channel.

BRIEF DESCRIPTION OF THE DRAWING

A radio communications system according to the invention will now be described, by way of example only, with reference to the sole FIGURE of the drawings which shows the radio communications system in block schematic form.

DETAILED DESCRIPTION OF PREFERRED EMBODIMENTS

The radio communications system comprises a plurality of different talkgroups each consisting of a number of individual radio units e.g. mobile and/or hand-portable radios. In a typical application, there may be as many a 100 talkgroups, and each talkgroup might consist of up to 50 or so radio units.

It will be assumed that if one of the radio units transmits data, that data will be received by all the other radio units in the same talkgroup, i.e. the talkgroups are 'all informed' talkgroups. It will also be assumed that, in normal operation, each radio unit can communicate with all the other radio units in the same talkgroup, but is unable to communicate with the radio units of any other talkgroup. However, if desired, some or all of the radio units could have the additional facility to be switched to a different talkgroup.

The radio units may transmit voice data or any other form of transmissible data.

As shown diagrammatically in the FIGURE, the radio units are distributed over four geographically separate zones Z1 . . . Z4 and a respective network radio unit NRU, i.e. a repeater unit is situated in each zone. It will, of course, be appreciated that the radio units could alternatively be distributed over more than four zones, or they could be confined to a single zone.

The radio units have a limited range and each radio unit will transmit and receive data via a local NRU. The NRUs are interconnected by a connecting infrastructure CI which enables a radio unit in one zone to communicate with radio units in all the other zones, and a network control system (NCS) is used to control the synchronization of data passing through the connecting infrastructure CI between the NRUs.

In this implementation of the invention, the radio units in any particular talkgroup can communicate with each other on one of five discrete communication channels CH1 . . . CH5 which has been temporarily assigned to that talkgroup. Each such communication channel consists of two different frequencies, one frequency being for transmission and the other frequency being for reception. The procedure by which channels are assigned to different talkgroups will be described in greater detail hereafter.

In operation, a radio unit (R1, say) transmits data on the transmission frequency of a channel which has been assigned to that radio unit's talkgroup. The data is received by the local NRU (in zone Z1) and retransmitted thereby on the reception frequency of the assigned channel, to be received by radio units in the same talkgroup which are also situated in zone Z1. The data is simultaneously routed to the other NRUs via the connecting infrastructure CI and these NRUs also retransmit the data on the reception frequency of the assigned channel. By this means the transmitted data will be received by all the radio units in the talkgroup, regardless of the zone in which they are situated.

To facilitate this operation, each NRU consists of five different sub-units NRU1 . . . NRU5, one for each of the channels and, similarly, the network control system NCS also consists of five sub-units NCS1 . . . NCS5, again one for each of the channels.

It will be apparent from the foregoing, that the radio units in a talkgroup will only be able to communicate with each other if one of the five channels has been assigned to that talkgroup.

As already explained, in hitherto known communications systems, particularly trunked systems, a finite set-up time has been required during which a radio unit transmits a request on a dedicated control channel that a communication channel be assigned to its talkgroup. However, the requirement for a finite set-up time is undesirable, especially in the case of high priority communications for which delays must be kept to the minimum. Also, it is undesirable to use a dedicated control channel, since that channel cannot then be used as a communication channel.

As will now be described in greater detail, the present radio communications system does not suffer from either of these shortcomings; that is, the system does not require a finite set-up time nor does it require a dedicated control channel.

Referring again to the FIGURE, the radio communications system includes a control unit CU which monitors activity in each NCS sub-unit to determine if the corresponding channel is "idle", i.e. that communication has not taken place on that channel for more than a predetermined or variable period.

If the control unit CU determines that one or more of the channels is "idle" it will designate one of these channels as the next "free channel". The control unit CU does this by generating a free channel (FC) signal for transmission by each NRU on the reception frequency of the designated channel, whereby to indicate to radio units that this channel is now available to be assigned to a talkgroup. To this end, the FC signal is routed to the corresponding sub-unit of each NRU via the connecting infrastructure CI and the corresponding sub-unit of the NCS.

Radio units belonging to a talkgroup which has not yet acquired an assigned channel will, nevertheless, scan through all the channels cyclically to detect for any FC signal that might be present. If the radio units detect a FC signal they will automatically tune to the transmission and reception frequencies of the designated channel. In this way, the radio units will be ready to start communicating, when required, without significant delay.

In this embodiment of the invention, the FC signal consists of relatively short encoded pulses, typically of 25 ms duration which are transmitted by the NRUs periodically, at intervals of 125 ms. The pulses are so timed as to occupy a different 25ms time slot within each successive 125 ms interval in dependence on the channel designated by the FC signal.

In a typical example, if the FC signal is being transmitted on channel CH1 (i.e. channel CH1 has been designated as the "free channel") each 25 ms pulse is transmitted during the first time slot in each successive 125 ms time interval, if the FC signal is being transmitted on channel CH2 (i.e. channel CH2 has been designated as the free channel) each 25 ms pulse is transmitted during the second time slot in each successive 125 ms time interval, and so on, and the radio units will be synchronised with the timing of the pulses so as to scan through the channels cyclically, in the correct sequence, to ensure detection of any FC signal that might be present.

If one of the radio units, in a talkgroup to which a channel has not yet been assigned, wishes to start communicating with the other radio units in the same talkgroup it will start transmitting data on the free channel to which the radio units will already be tuned.

The transmitted data contains an encoded talkgroup identification (TG) signal which identifies the talkgroup containing the transmitting radio unit. The TG signal will be recognised by all the radio units in the corresponding talkgroup and so they will treat the transmitted data as being intended for their talkgroup and will remain tuned to the same channel. Conversely, the TG signal will not be recognised by the radio units of any other talkgroup and so these radio units will ignore the transmitted data and will attempt to retune to a different channel.

If, on the other hand, the channel is "quiet", i.e. the transmission of data has temporarily ceased, the control unit CU causes the TG signal to be repeatedly transmitted by the appropriate sub-unit of each NRU.

In this way, the control unit assigns the free channel to the talkgroup identified by the TG signal, enabling the radio units in that talkgroup to communicate with each other on that channel to the exclusion of radio units in any other talkgroup.

The newly assigned channel will no longer be available as a free channel, and the control unit CU will designate another idle channel (if available) as the free channel and will cause the FC signal to be transmitted on the reception frequency of this channel by the corresponding sub-unit of each NRU. As before, radio units belonging to talkgroups which have not acquired a channel will automatically retune to the new free channel so as to be ready to start transmitting on this channel, when required. To this end, the radio units may scan through the channels cyclically, as before, to detect for the FC signal. Alternatively, the control unit CU could transmit a "channel indicator" signal on the old free channel which identifies the new channel to which the radio units must retune.

It will be appreciated from the foregoing that in contrast to hitherto known radio communication systems, particularly trunked systems, the present system does not require a finite set-up time because all the radio units belonging to talkgroups which have not yet acquired a communication channel will already be tuned to a free channel. Therefore, they are ready to start communicating without any significant delay. Furthermore, the system does not require a dedicated control channel because each free channel (which, in effect, facilitates the assignment of a new channel) is also used as a communication channel.

The same TG signal will be generated (and recognised) by all the radio units in a talkgroup. In this embodiment, the TG signal also consists of encoded pulses, of 25 ms duration. If the assigned channel is busy, i.e. data is actually being transmitted on the channel, the encoded pulses are transmitted at 500 ms intervals in the data stream. If, on the other hand, the channel is "quiet", i.e. the transmission of data has temporarily ceased, the encoded pulses are transmitted more frequently, at 125 ms intervals, thereby maintaining the assigned status of the channel. However, the assigned status may only be maintained for a predetermined or variable hang-up time following which it will be assumed that all communication in the talkgroup has ceased. In this event, the assignment of the channel to the current talkgroup is terminated, i.e. transmission of the TG signal ceases, thereby releasing the channel for use by a different talkgroup. The predetermined or variable hang-up time may be dependent upon the talkgroup, and may typically be of the order of a minute.

Alternatively, even if communication on a particular channel has ceased it might, in some situations, be desirable to maintain the assigned status of the channel for longer than the hang-up time, until the channel is actually needed by another talkgroup (because no other channel is idle), thereby avoiding frequent and possibly unnecessary reassignment of channels. Such a situation might arise in the case of a talkgroup whose radio units communicate frequently and for which there is a high expectation that a communication which has ceased will resume quickly.

The foregoing describes a system in which each channel can be temporarily assigned to different talkgroups.

However, in another implementation of the invention, at least one of the channels is assigned by the network management facility (NMF) to a predetermined talkgroup and cannot be temporarily assigned to any other talkgroup. Preset channels of this kind are useful in the case of high priority talkgroups for which a communication channel must be available at all times. Furthermore, a preset channel could be used as an emergency channel to which a radio unit in any talkgroup could be switched.

When an increasingly large number of talkgroups share a large (but fewer) number of communication channels and each channel is active for a sizeable proportion of the time available, then radio units may spend undesirably long periods searching for a 'free channel' that could be used by the relevant talkgroup. This may be necessary when a radio unit is switched on and has to find the free channel, or when a talkgroup finishes a conversation and the radio units must 'catch up' with the 'free channel'.

A further embodiment of the invention provides a way of reducing the length of time required to search for a new free channel, when the existing free channel is taken by one of the talkgroups. This is achieved by dividing the available communication channels into groups of channels and allocating all but one of the groups of channels to different respective groups of talkgroups. The remaining group of channels then provides a dynamic reserve for all of the other groups of communication channels.

In general, the communication channels may be grouped into 'n' groups of communication channels, GCC(1) to GCC(n), and allocated to 'n' groups of talkgroups, GTG(1) to GTG(n) respectively. Thus the first groups of talkgroups, GTG(1), is allocated the first group of communication channels, GCC(1), and so on up to GTG(n) allocated GCC(n). The GCC belonging to a GTG will be referred to herein as the GTG's 'home' group of communication channels. The reserve group of communication channels will be referred to herein as RGCC. As in the case of the previously described embodiment, each communication channel operates at a different pair of transmission and reception frequencies.

The number of talkgroups in a GTG does not need to be the same for all the talkgroups, which would allow one GTG to be a small number of higher-priority talkgroups, and another GTG to be a larger number of lower-priority talkgroups. A further possibility for a GTG would be a number of top priority talkgroups, no greater in number than the number of channels in each GCC, each of which would then be supported in effect with a channel of its own (though any talkgroup could be served by any communication channel). Under normal circumstances, the GTG would be served solely by the communication channels in its home group of channels, and the GTG would not use any of the reserve group of communication channels. The reserve group of channels would however provide a hot standby facility for this top priority GTG, in the event of a system failure within the home group of channels. At the same time, the reserve group of communication channels would provide a hot standby facility to all talkgroups.

As already described, the transmissions of the free channel signals FC are carefully timed into successive time slots to coincide with the scanning cycle of the radio units. This co-ordination is not interrupted if the number of communication channels in each GCC and the RGCC is the same.

In normal operation, each GCC serves the respective GTG, operating as an autonomous communication group. Each GTG has its own distinct free channel signal, the free channel signals for GTG(1) up to GTG(n) being designated respectively FC1 up to FCn, the FC signals differing in the data encoded in them. In normal operation FC1 will be found amongst the communication channels in GCC(1); FC2 will be found amongst the communication channels in GCC(2) ; and so on up to FCn being found amongst the communication channels in GCC(n).

In the previously described embodiment of the invention, when all available communication channels are in use, serving the maximum number of talkgroups possible (equal to the number of communication channels), then no free channel signal is transmitted in any of the communication channels. However, in this embodiment, when one of the groups of communication channels is fully occupied by talkgroups in the respective group of talkgroups, then the control unit (CU) allows use of the reserve group of communication channels (RGCC). As soon as all of the communication channels in a group of channels are in use, the control unit (CU) will seek to transmit the corresponding free channel signal in one of the communication channels in the RGCC. For the purpose of illustration, and without loss of generality, it will now be assumed that it is GCC(1) that is fully occupied by the talkgroups of GTG(1).

At this point, the radio units in all of the talkgroups in GTG(1) that are not using communication channels of GCC(1) will search for their free channel signal FC1 amongst the RGCC. If the radio units find the respective free channel signal FC1 amongst those reserve channels, then they stay on that channel within the RGCC until a talkgroup requires the use of that communication channel. At that point, the radio units will remain on the channel and will start to communicate with each other if they are members of the talkgroup that now requires the channel (i.e. the control unit (CU) assigns the channel to the talkgroup); otherwise, the radio units will again scan for FC1.

If by that time there are idle channels amongst GCC(1), then FC1 may revert to one of these channels. In an alternative operation, the free channel signal will not revert to the home group of communication channels until more than a specified number of those communication channels have become available; until then, the free channel signal FC(1) will continue to reside within the reserve group of channels. The decision to revert to the home group of channels or to remain within the reserve group of channels could be determined dynamically, dependent on channel loadings in the various GCCs.

The radio units of any GTG are programmed to search for the respective free channel signal within their home group of channels, and only look in the reserve group of channels when the free channel signal cannot be found within the home group of channels (because all the channels in the home group have already been assigned). If the free channel signal cannot be found among the reserve group of channels, then the radio units are programmed to revert to their home group of channels to search again for the respective free channel signal. This operation allows for the late entry of a radio, for example if it has temporarily lost contact with the other channels, or has been switched off for a period of time.

If more than one GTG is using all of the communication channels in the respective GCCs, then those GTGs will need their free channel signals to be transmitted within the RGCC. In that case, the free channel signals will be placed into different communication channels within the RGCC. As already explained, each radio unit distinguishes between the free channel signal of its own GTG and the free channel signal of another GTG by the different data encoded into the free channel signal pulses. As long as the number of communication channels in the RGCC exceeds the total number of GTGs, then the RGCC could in extreme circumstances accommodate the free channel signals of all of the GTGs simultaneously.

This further embodiment has the effect of providing each GTG with a predetermined number of communication channels, expanding this number of channels when the demand arises, and reducing the channels when the demand is absent. The balance between the numbers of channels in the home groups of channels and the reserve group of channels would depend upon the particular application.

Furthermore, this embodiment of the invention reduces the number of communication channels through which a radio unit must scan each time it is switched on to locate a free channel signal, and this in turn reduces the length of the scan cycle.

In the foregoing embodiments, each communication channel operates at a different transmission/reception frequency.

Alternatively, the communication channels could be arranged on a multiplexing basis. For example, the communication channels could be arranged on a time division multiplexing basis whereby each channel occupies a different transmission/reception time slot. Alternatively, the communication channels could be arranged on a code division multiple access multiplexing basis.

What is claimed is:

1. A radio communications system comprising
   a plurality of discrete communications channels,
   a plurality of talkgroups, each said talkgroup comprising a plurality of individual radio units, said plurality of individual radio units of at least one of said plurality of talk groups capable of being in communication with each other or not being in communication with each other, and
   control means arranged to select a communication channel that is idle from said communication channels and to transmit a free channel signal on the selected communication channel,
   said individual radio units that are not in communication with each other being tuned to said selected communication channel in response to said free channel signal transmitted by said control means such that when a said individual radio unit that is tuned to said selected communication channel initiates communication with other radio units in its talkgroup, said individual radio unit initiating communication starts transmitting on said selected communication channel,
   said control means being arranged to assign said selected communication channel to said talkgroup of said individual radio unit initiating communication in response to said individual radio unit initiating communication transmitting on said selected communication channel whereby all of the individual radio units of said talkgroup of said individual radio unit initiating communication are enabled to communicate with each other on said selected communication channel.

2. A radio communication system as claimed in claim 1 wherein
   said talkgroups are arranged in a plurality of different groups,
   a portion of said communication channels are arranged in a plurality of home groups, each said home group being allocated to a different respective said group of talkgroups, and
   a portion of said communication channels are arranged in a reserve group of said communication channels that is not allocated to any said group of talkgroups,
   the control means is arranged to transmit a different respective free channel signal for each said group of talkgroups,
   said control means is arranged to select a home group communication channel that is currently idle from each said home group and to transmit said respective free channel signal on the selected home group communication channel,
   said radio units of each said group of talkgroups being responsive to the respective free channel signal for that group of talkgroups so that when said individual radio unit initiating communication with other radio units in its talkgroup initiates communication, said individual radio unit initiating communication transmits on the selected communication channel carrying the respective free channel signal for that talkgroup's group of talkgroups, said control means is arranged to assign said selected communication channel to the talkgroup of said individual radio unit initiating communication in response to said individual radio unit initiating communication transmitting on said selected communication channel, enabling all the radio units in the talkgroup of said individual radio unit initiating communication to communicate with each other over the selected communication channel, and said control means is further arranged to transmit said respective free channel signal on an idle channel of said reserve group of communication channels and to assign said idle channel to a given talkgroup if all the communication channels in the home group of communication channels allocated to said given talkgroup's group of talkgroups have already been assigned by the control means.

3. A method for operating a radio communications system including a plurality of discrete communication channels and a plurality of talkgroups, each said talkgroup comprising a plurality of individual radio units, the method comprising the steps of selecting a communications channel that is idle, transmitting a free channel signal on the selected communication channel, tuning said radio units that are not in communication to said selected communication channel in response to said free channel signal, causing a radio unit that is tuned to the selected communication channel to start transmitting on said selected communication channel when said radio unit initiates communication with other radio units of a talkgroup to which said transmitting radio unit belongs, and assigning the selected communication channel to said talkgroup to which said transmitting radio unit belongs in response to said transmission of said transmitting radio unit that is tuned to the selected communication channel to enable all the radio units of said talkgroup to which said transmitting radio unit belongs to communicate with each other on said selected communication channel.

4. A radio communications system as claimed in claim 1, wherein at least one of said communication channels is assigned to a predetermined said talkgroup and cannot be temporarily assigned to any other talkgroup.

5. A radio communications system as claimed in claim 1, wherein said control means causes a talkgroup identification signal to be transmitted on the selected communication channel in response to said individual radio unit initiating communication with other radio units in its talkgroup.

6. A radio communications system as claim in claim 5, including a plurality of network radio units for transmitting radio signals to and receiving radio signals from the radio units, connecting means for interconnecting the network radio units, and a network control system coupled to the connecting means, wherein said control means is connected to the network control system and is arranged to control transmission of said free channel signal and said talkgroup identification signal to the radio units via the network control system, the connecting means and the network radio units.

7. A radio communications system as claimed in claim 5, wherein said radio units which are not in use repeatedly scan said communication channels to detect said free channel signal and/or their respective talkgroup identification signal.

8. A radio communications system as claimed in claim 1, wherein said control means terminates the assignment of a said selected communication channel to a talkgroup if communication on the channel ceases for more than a predetermined period.

9. A radio communications system as claimed in claim 1, wherein each radio unit can be manually switched to a different talkgroup.

10. A radio communications system as claimed in claim 1, wherein each communication channel operates at a different transmission/reception frequency.

11. A radio communications system as claimed in claim 1, wherein said communication channels are defined using a multiplexing technique.

12. A radio communications system as claimed in claim 11, wherein said communication channels are defined using a time division multiplexing technique or a code division multiple access multiplexing technique.

13. A radio communications system as claimed in claim 1 wherein said talkgroups are arranged in groups, at least a portion of said communication channels are arranged in a number of distinct home groups, each said home group being allocated to a different group of talkgroups, and at least a portion of said communication channels comprising a reserve group of communication channels, wherein said control means is arranged to transmit a different said free channel signal for each said group of talkgroups, and has the capability to assign a communication channel of the reserve group to a talkgroup if all the communication channels in the corresponding home group for that talkgroup have already been assigned.

14. A radio communications system as claimed in claim 13, wherein the control means transmits the "free channel" signal for a respective home group on a communication channel of the reserve group if all the communication channels for that respective home group have already been assigned, and transfers the "free channel" signal from the reserve group of a channel of the home group if the assignment of one or more channels in the home group is terminated.

15. A radio communications system as claimed in claim 2, wherein the control means is arranged to transfer the free channel signal from the reserve group of communication channels to a communication channel in the corresponding home group of communication channels if the assignment of one or more communication channels in the home group is terminated.

16. A method as claimed in claim 3, whereby at least one of said communication channels is assigned to a predetermined said talkgroup and cannot be temporarily assigned to any other talkgroup.

17. A method as claimed in claim 3 including transmitting a talkgroup identification signal on the selected communication channel in response to said transmission of said transmitting radio unit.

18. A method as claimed in claim 17, wherein said radio units which are not in use repeatedly scan through said communication channels to detect said free channel signal and/or their respective talkgroup identification signal.

* * * * *